United States Patent [19]
He et al.

[11] Patent Number: 5,937,113
[45] Date of Patent: Aug. 10, 1999

[54] OPTICAL GRATING-BASED DEVICE HAVING A SLAB WAVEGUIDE POLARIZATION COMPENSATING REGION

[75] Inventors: Jian-Jun He; Emil S. Koteles, both of Ottawa; L. Erickson, Cumberland; B. Lamontagne, Ottawa; A. Delage, Gloucester, all of Canada

[73] Assignee: National Research Council of Canada, Ottawa, Canada

[21] Appl. No.: 09/061,939

[22] Filed: Apr. 17, 1998

[51] Int. Cl.$^6$ .................................................. G02B 6/00
[52] U.S. Cl. .............................................................. 385/11
[58] Field of Search ................................. 385/11, 14, 31, 385/36, 37, 46, 10, 147; 250/227.23; 372/20, 100, 102, 92; 359/333, 120, 344, 349, 136, 118

[56] References Cited

U.S. PATENT DOCUMENTS

| | | | |
|---|---|---|---|
| 4,696,536 | 9/1987 | Albares et al. | 350/96 |
| 4,715,027 | 12/1987 | Mahapatra et al. | 370/3 |
| 4,747,649 | 5/1988 | Heinen et al. | 350/96 |
| 4,786,133 | 11/1988 | Gidon et al. | 350/96 |
| 4,938,553 | 7/1990 | Maerz et al. | 350/96 |
| 5,002,350 | 3/1991 | Dragone | 350/96 |
| 5,136,671 | 8/1992 | Dragone | 385/46 |
| 5,206,920 | 4/1993 | Cremer et al. | 385/37 |
| 5,325,221 | 6/1994 | Van der Tol | 359/116 |
| 5,414,548 | 5/1995 | Tachikawa et al. | 359/130 |
| 5,425,116 | 6/1995 | Dragone et al. | 385/24 |
| 5,488,680 | 1/1996 | Dragone | 385/24 |
| 5,526,153 | 6/1996 | Glance | 359/123 |
| 5,570,226 | 10/1996 | Ota | 359/333 |
| 5,600,742 | 2/1997 | Zirngibl | 385/37 |
| 5,675,675 | 10/1997 | Trouchet | 385/24 |
| 5,684,899 | 11/1997 | Ota | 385/24 |
| 5,706,377 | 1/1998 | Li | 385/37 |
| 5,773,345 | 6/1998 | Ota | 438/286 |
| 5,784,507 | 7/1998 | Holm-Kennedy et al. | 385/31 |
| 5,799,118 | 8/1998 | Ogusu et al. | 385/14 |
| 5,854,700 | 12/1998 | Ota | 359/136 |

OTHER PUBLICATIONS

H. Takahashi, Y. Hibino, and I. Nishi, "Polarization–insensitive arrayed waveguide grating wavelength multiplexer on silicon", Opt. Lett., vol. 17, No. 7, pp. 499–501.

H. Takahashi, Y. Hibino, Y. Ohmori, and, M. Kawachi, "Polarization insensitive arrayed waveguide wavelength demultiplexer with birefringence compensating film", IEEE Photon. Technol. Lett., vol. 5, pp. 707–709, 1993.

M. Zirngibl, C. H. Joyner, and P.C. Chou, "Polarization compensated waveguide grating router on InP", Electron. Lett., vol. 31, pp. 1662–1664, 1995.

M. Zirngibl, C. H. Joyner, L. W. Stulz, Th. Gaigge and C. Dragone, "Polarization independent 8×8 waveguide grating multiplexer on InP", Electron. Lett., vol. 29, pp. 201–201, 1993.

L. H. Spiekman, M. R. Amersfoort, A. H. de Vreede, F. P. G. M. van Ham, A. Kuntze, J. W. Pedersen, P. Demeester, and M. K. Smit, "Design and realization of polarization independent phased array wavelength demultiplexers using different array order for TE and TM", J. Lightwave Technol., vol. 14, pp. 991–995, 1996.

(List continued on next page.)

*Primary Examiner*—Akm E. Ullah
*Attorney, Agent, or Firm*—Neil Teitelbaum & Associates

[57] ABSTRACT

A device for compensating the birefringence normally associated with an integrated optical waveguide grating device has a polarization compensating slab waveguide region. This compensating region can be provided within the slab waveguide region normally present in the grating device by etching, doping, ion implanting a sub-region of a predetermined shape and dimension to change its birefringence. Alternatively, or in combination with changing the birefringence in this sub-region, electrodes can be provided for electro-optically changing the birefringence dynamically as required. This device can be applied to reflective and transmissive diffraction gratings and to phased array waveguide gratings.

28 Claims, 7 Drawing Sheets

OTHER PUBLICATIONS

J. B. D. Soole, M. R. Amersfoort, H. P. Leblanc, N. C. Andreadakis, A. Raijhel, C. Caneau, M. A. Koza, R. Bhat, C. Youtsey, and I. Adesida, "Polarization–independent InP arrayed waveguide filter using square cross–section waveguides", Electron. Lett., vol. 32, pp. 323–324, 1996.

H. Bissessur, P. Pagnod–Rossiaux, R. Mestric, and B. Martin, "Extremely small polarization independent phased–array demultiplexers on InP", IEEE Photon. Technol. Lett., vol. 8, pp. 554–556, 1996.

H. Bissessur, F. Gaborit, B. Martin, P. Pagnod–Rossiaux, J. L. Peyre and M. Renaud, "16 channel phased array wavelength demultiplexer on InP with low polarization sensitivity", Electron. Lett., vol. 30, pp. 336–337, 1994.

E. Gini, W. Hunziker, and H. Melchior, "Polarization independent WDM multiplexer/demultiplexer module", J. Lightwave Tech., vol. 16, pp. 625–630, 1998.

OPTICAL GRATING-BASED DEVICE HAVING A SLAB WAVEGUIDE POLARIZATION COMPENSATING REGION

FIELD OF THE INVENTION

This invention relates generally to an integrated polarization compensated optical waveguide grating device, and more particularly to a wavelength multi/demultiplexer exhibiting little or no polarization sensitivity, or alternatively to an optical device that has a controlled amount of polarization sensitivity.

BACKGROUND OF THE INVENTION

Integrated wavelength multi/demultiplexers are important components for wavelength division multiplexing (WDM) optical communication systems. Integration offers the advantages of compactness, reliability, and reduced packaging costs. Further, implementation in a semiconductor material, particularly the InGaAsP/InP system important for optical fiber communications systems, would permit monolithic integration of these passive devices with active ones, such as lasers, modulators, optical switches, and detectors, resulting in sophisticated wavelength sensitive photonic integrated circuits with complex functionalities.

Heretofore, one of the major drawbacks in an integrated wavelength multi/demultiplexer is the polarization sensitivity of the device. Since an optical signal propagating through an optical fiber has an indeterminate polarization state, the switching/routing devices must be substantially polarization insensitive. However, planar waveguides usually have different propagation constants for TE (transverse electric) and TM (transverse magnetic) waveguide modes. For wavelength multi/demultiplexers, this difference in propagation constants results in a wavelength shift in the spectral response peak or the passband of each wavelength channel. This wavelength shift is sensitive to the design of the planar waveguide, and can be as large as 3 nm. As WDM systems are being designed towards smaller and smaller channel spacing (from 1.6 nm to 0.8 nm or even less in the future), even a small polarization dependent wavelength shift (e.g. 0.3–0.4 nm) is of concern.

Two types of integrated wavelength multi/demultiplexers that have been widely investigated are phased waveguide arrays and grating-on-a-chip spectrometers.

Grating based devices require high quality, deeply etched grating facets. The optical loss of the device depends critically on the verticality and smoothness of the grating facets. However, the size of the grating device is usually much smaller than the phased array and the spectral finesse is much higher due to the fact that the number of teeth in the grating is much larger than the number of waveguides in the phased array. This allows the grating based device to have a larger number of channels available over its free spectral range (FSR) and consequently can be scaled-up easily to high density operation.

In waveguide array based devices, several approaches have been used to compensate for the undersized polarization sensitivity; for example the insertion of a half wave plate in the middle of the waveguides array is described by H. Takahashi, Y. Hibino, and I. Nishi, in a paper entitled "Polarization-insensitive arrayed waveguide grating wavelength multiplexer on silicon", Opt. Lett., vol. 17, no. 7, pp. 499–501, 1992.

Alternatively, the use of non-birefringent waveguides with a square cross section has been described by J. B. D. Soole, M. R. Amersfoort, H. P. Leblanc, N. C. Andreadakis, A. Raijhel, C. Caneau, M. A. Koza, R. Bhat, C. Youtsey, and I. Adesida, in a paper entitled "Polarization-independent InP arrayed waveguide filter using square cross-section waveguides", Electron. Lett., vol. 32, pp. 323–324, 1996.

Birefringence compensation using two different rib waveguides has been described by P. C. Chou, C. H. Joynerm M. Zirngibl, in U.S. Pat. No. 5,623,571 entitled "Polarization compensated waveguide grating router". In the '571 patent the polarization compensation is not within the slab waveguiding region. This technique requires either two regrowth steps as described in the patent and in a paper by the same authors entitled "Polarization compensated waveguide grating router on InP", Electron. Lett., vol. 31, pp. 1662–1664, 1995, or two etching steps as described by C. G. M. Vreeburg, C. G. P. Herben, X. J. M. Leijtens, M. K. Smit, F. H. Groen, J. J. G. M. van der Tol and P. Demeester, in a paper entitled "An improved technology for eliminating polarization dispersion in integrated phasar demultiplexers", in Proc. $23^{rd}$ Conf. on Optical Comm. (ECOC'97), pp. 3.83–3.86, Edinburgh, UK, 1997. In addition to increased complexity in fabrication process, the reduced cladding layer thickness in the polarization compensating rib/ridge waveguides resulted in a reduced lateral index contrast, and consequently increased phase errors due to enhanced coupling between adjacent waveguides. In order to avoid radiation loss due to reduced index contrast, the polarization compensating waveguides need to be implemented in straight waveguide section, which leads to an additional straight section length of the arrayed waveguides and consequently a larger device size.

Yet another alternative in the attempt to overcome polarization sensitivity is dispersion matching with adjacent diffraction orders which has been described by M. Zirngibl, C. H. Joyner, L. W. Stulz, Th. Gaigge and C. Dragone, in a paper entitled "Polarization independent 8×8 waveguide grating multiplexer on InP", Electron. Lett., vol. 29, pp. 201–201, 1993, and by L. H. Spiekman, M. R. Amersfoort, A. H. de Vreede, F. P. G. M. van Ham, A. Kuntze, J. W. Pedersen, P. Demeester, and M. K. Smit, in a paper entitled "Design and realization of polarization independent phased array wavelength demultiplexers using different array order for TE and TM", J. Lightwave Technol., vol. 14, pp. 991–995, 1996.

Another approach is that of using layer structures with low birefringence by using thick guiding layer and low refractive index contrasts has been described by H. Bissessur, F. Gaborit, B. Martin, P. Pagnod-Rossiaux, J. L. Peyre and M. Renaud, in a paper entitled "16 channel phased array wavelength demultiplexer on InP with low polarization sensitivity", Electron. Lett., vol. 30, pp. 336–337, 1994.

For diffraction grating based wavelength multi/demultiplexers, only the last two approaches are possible. In the polarization compensation method which attempts to match the TE and TM passband to two adjacent diffraction orders, the free spectral range (FSR) of the grating needs to be chosen equal to the wavelength split between the two modes. In this case, the passband corresponding to the mth-order for TE will overlap with the (m−1)th order for TM. A severe drawback of this method is that the available FSR for WDM channels is limited by the polarization split, which is determined by the waveguide layer structure. It is usually limited to a few nanometers. A large polarization split is preferable in this case. In addition, since the polarization dispersion is very sensitive to the exact layer composition and thickness, it is difficult to obtain a good match due to the non-uniformity and non-reproducibility of wafer growths.

Another method for achieving polarization insensitive operation in diffraction grating based wavelength multi/demultiplexer is to use a birefringence-reduced layer structure, combined with an input/output waveguide design for a flattened channel response. Polarization dispersion as small as 0.3–0.4nm has been obtained with InGaAsP/InP double heterostructures as is described by J.-J. He, B. Lamontagne, A. Delage, L. Erickson, M. Davies, and E. S. Koteles, in a paper entitled "Monolithic integrated wavelength demultiplexer based on a waveguide Rowland circle grating in InGaAsP/InP", J. Lightwave Tech, vol. 16, pp.631–638, 1998. Lower birefringence waveguides can be designed by using a thick guiding layer and low refractive index contrast between the guiding and cladding layers. However, low index contrast InGaAsP/InP layers are very difficult to grow in practice. One way to obtain low index contrast waveguides is to use homogenous InP with different doping levels for the guiding and cladding layers, as suggested by Gini, W. Hunziker, and H. Melchior, in a paper entitled "Polarization independent WDM multiplexer/demultiplexer module", J. Lightwave Tech, vol. 16, pp.625–630, 1998. Although a polarization dispersion as small as 0.001 nm was obtained, the layer structure design poses severe limitations on what kind of devices can be integrated. Moreover, the thick guiding layer results in a much more stringent requirement on the verticality of the grating facet in order to keep reflection loss low.

It is an object of the invention to provide a compact, diffraction grating or phased array based optical multiplexer/demultiplexer that is substantially polarization insensitive and which overcomes many of the limitations of prior art devices.

SUMMARY OF THE INVENTION

In accordance with the invention, there is provided, a method of compensating for birefringence normally associated with the propagation of light in a planar waveguide device having a slab waveguiding region having a first birefringence, comprising the steps of: providing within the slab waveguiding region a second region having a predetermined shape and predetermined dimensions, the second region having a second different birefringence than the first birefringence for providing polarization compensation of the device.

In accordance with another aspect of the invention, there is provided, an integrated polarization compensated optical waveguide diffraction grating device comprising:

an input region having an input port, an output region having at least a plurality of predetermined light receiving locations, a first slab waveguide region having a first birefringence, said slab waveguide region being optically coupled with the input and output regions for partially confining a beam of light launched from the input region between two substantially parallel planes, a diffraction grating disposed to receive a beam of light launched from the input port through the slab waveguide region and to separate the beam into sub-beams of light of different wavelengths to the plurality of predetermined light receiving locations, a second slab waveguide region adjacent to the first slab waveguide region having a predetermined shape and predetermined dimensions, said second slab waveguide region having a second different birefringence than the first slab waveguide region for providing polarization compensation of the device.

In accordance with the invention there is provided, an optical planar waveguiding light-transmissive device comprising:

an input/output region having an input waveguide and a plurality of predetermined light receiving locations;

a slab waveguide having a first region having a first birefringence, said first region being optically coupled with the input/output region for partially confining a beam of light launched from the input region between two parallel planes;

a diffraction grating disposed to receive a beam of light launched from the at least an input waveguide through the slab waveguide and to separate the beam into sub-beams of light of different wavelengths to the plurality of predetermined locations;

a polarization offsetting region comprising a different region of the slab waveguide, the polarization offsetting region having a predetermined shape and predetermined dimensions and having a different birefringence than the first region for at least partially offsetting the birefringence of the first region.

In accordance with the invention there is further provided, an integrated at least substantially polarization compensated optical waveguide grating device comprising:

an input region having an at least an input port, an output region having at least a plurality of predetermined light receiving locations for receiving light from the input region, an input slab waveguide region and an output slab waveguide region each having a predetermined birefringence, said input slab waveguide region being optically coupled with the input region for partially confining a beam of light launched from the input region between two parallel planes, said output slab waveguide region being optically coupled with the output region for partially confining a beam of light launched from the input region between two parallel planes, a grating disposed between the input slab waveguide region and the output slab waveguide region to receive a beam of light launched from the at least the input port through the input slab waveguide region and to separate the beam into sub-beam of light of different wavelengths to the plurality of predetermined light receiving locations through the output slab waveguide region, a compensating slab waveguide region between the input port and the output region having a predetermined shape and predetermined dimensions and having a different birefringence than the predetermined birefringence of at least one of the input and output slab waveguide regions for providing polarization compensation of the device.

In accordance with the invention there is further provided an optical planar waveguiding light-transmissive device comprising:

an input region having an input port and a plurality of predetermined light receiving locations at an output region;

input and output slab waveguide regions each having a predetermined birefringence, said input slab waveguide region being optically coupled with the input port for partially confining a beam of light launched from the input port between two parallel planes; said output slab waveguide region being optically coupled with the output locations for partially confining a beam of light launched thereinto between two parallel planes;

a transmissive grating disposed to receive a beam of light launched from the at least an input port and to provide beams to the output slab waveguide for separation into sub-beams of light of different wavelengths to the plurality of predetermined locations;

a polarization-compensating region comprising at least a different region of at least one of the slab waveguides, the polarization compensating region having a different birefringence or being able to exhibit a different birefringence than a region of the at least one of the slab waveguides, for offsetting its birefringence.

This invention provides a convenient method of compensating the polarization dispersion in grating based wavelength demultiplexers by incorporating a specially shaped area with modified index, however the incorporation of this specially shaped area does not alter the size of the grating based multi/demultiplexer. Advantageously, its implementation in the fabrication process uses a standard shallow etch technique that is very simple and relatively inexpensive to implement requiring no additional processing steps as the polarization compensator can be chemically etched at the same time as the shallow input ridge waveguides. The method of this device can conveniently be applied to a wide range of waveguide structures and material systems.

The device in accordance with the invention can be used to offset birefringence to various degrees and in some preferred instances can be designed to completely offset birefringence to completely compensate for differences between TE and TM modes.

BRIEF DESCRIPTION OF THE DRAWINGS

Exemplary embodiments of the invention, will now be described, in conjunction with the drawings, in which:

FIG. 3a is a wavelength demultiplexer similar to that of FIG. 1 however having a polarization compensator in accordance with this invention is schematically shown;

FIG. 4 is a graph of intensity versus wavelength for TE and TM polarized light shown to have their spectrums corresponding to one another, indicating no polarization sensitivity for the device of FIG. 3a;

DETAILED DESCRIPTION

Figure 1:
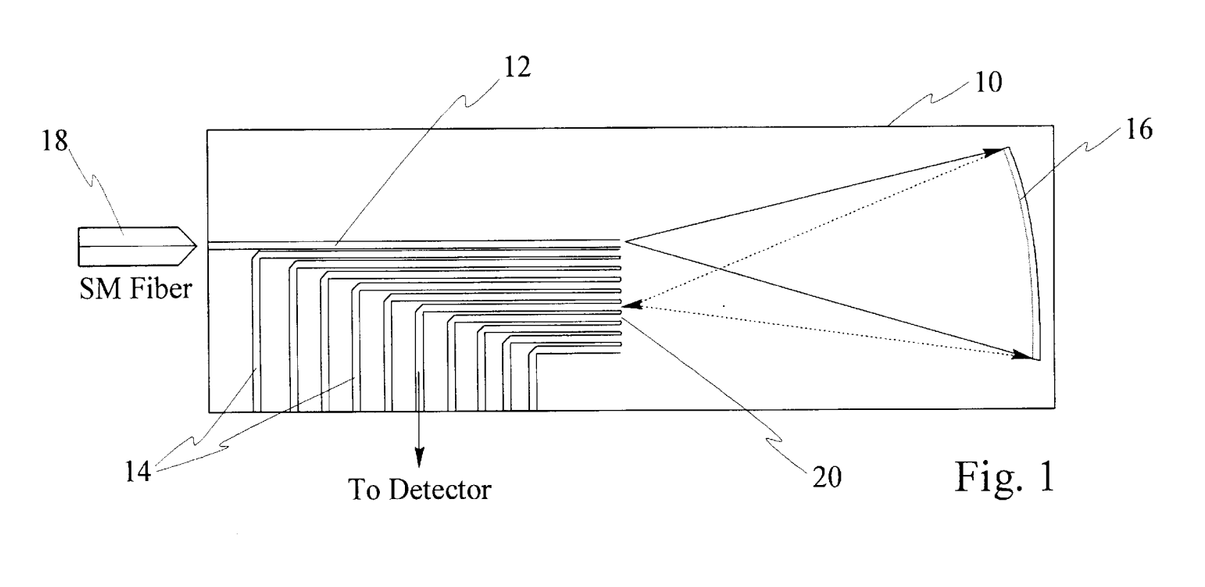
FIG. 1 is a prior art schematic diagram of an integrated waveguide diffraction grating device.
Figure 2:
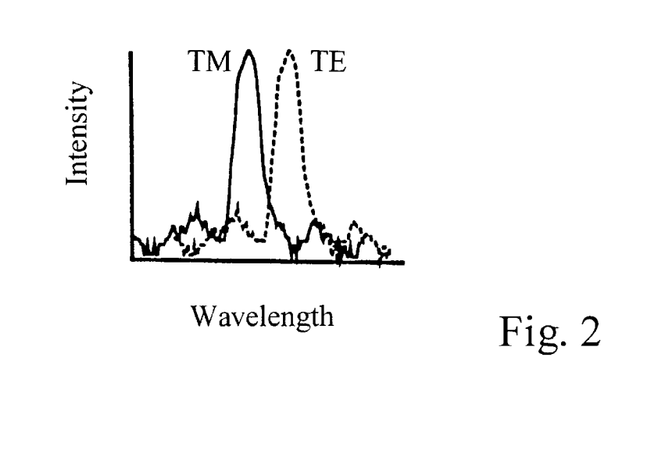
FIG. 2 is a graph of intensity versus wavelength for TE and TM polarized light shown to have their spectrums relatively shifted for the device of FIG. 1.

Referring now to prior art FIG. 1 the schematic of a typical wavelength demultiplexer 10 based on an integrated diffraction grating is shown. It consists of input/output waveguide arrays 12, 14 and an etched diffraction grating 16. The incoming optical signals of different wavelengths are coupled from an optical fiber 18 to an input end of the waveguide of the demultiplexer. At the end of the input waveguide, the light diverges into the slab waveguide and is then focused back to the inputs of the output waveguides by the curved echelle grating. Due to the dispersive property of the diffraction grating 16, light signals of different wavelengths are focused onto different output waveguides. For a given wavelength, the position of the focused spot, for example the location 20, depends on the effective index of the slab waveguide, in addition to geometrical parameters of the grating. Because the effective indices of the slab waveguide are different for TE and TM modes (and hence the slab exhibits birefringence), the focused spots do not overlap for the two polarizations, resulting in a polarization dependent wavelength shift in the channel response function, as shown in FIG. 2. Here the wavelengths of the TE and TM modes are shown to be relatively shifted. This polarization dependency produces intensity noise in the detected signal due to the polarization instability of the incoming optical signal from a fiber. It also increases the crosstalk between adjacent channels. In contrast, FIG. 4 shows no shift between the TE and TM modes.

The birefringence or polarization dispersion is determined by the effective index difference $\Delta n$ of the slab waveguide for TE and TM modes. In an InGaAsP/InP heterostructure optimized for the least polarization sensitivity, such as the one described in the paper by He. et al. entitled "Monolithic integrated wavelength demultiplexer based on a waveguide Rowland circle grating in InGaAsP/InP", the wavelength shift between the two polarizations is typically around 0.4 nm.

Usually two etching processes are required for the grating based wavelength demultiplexers: one shallow etching for defining single mode waveguides and one deep etching for the grating facets, turning mirrors, and multimode waveguides.

Figures 3A, 4:
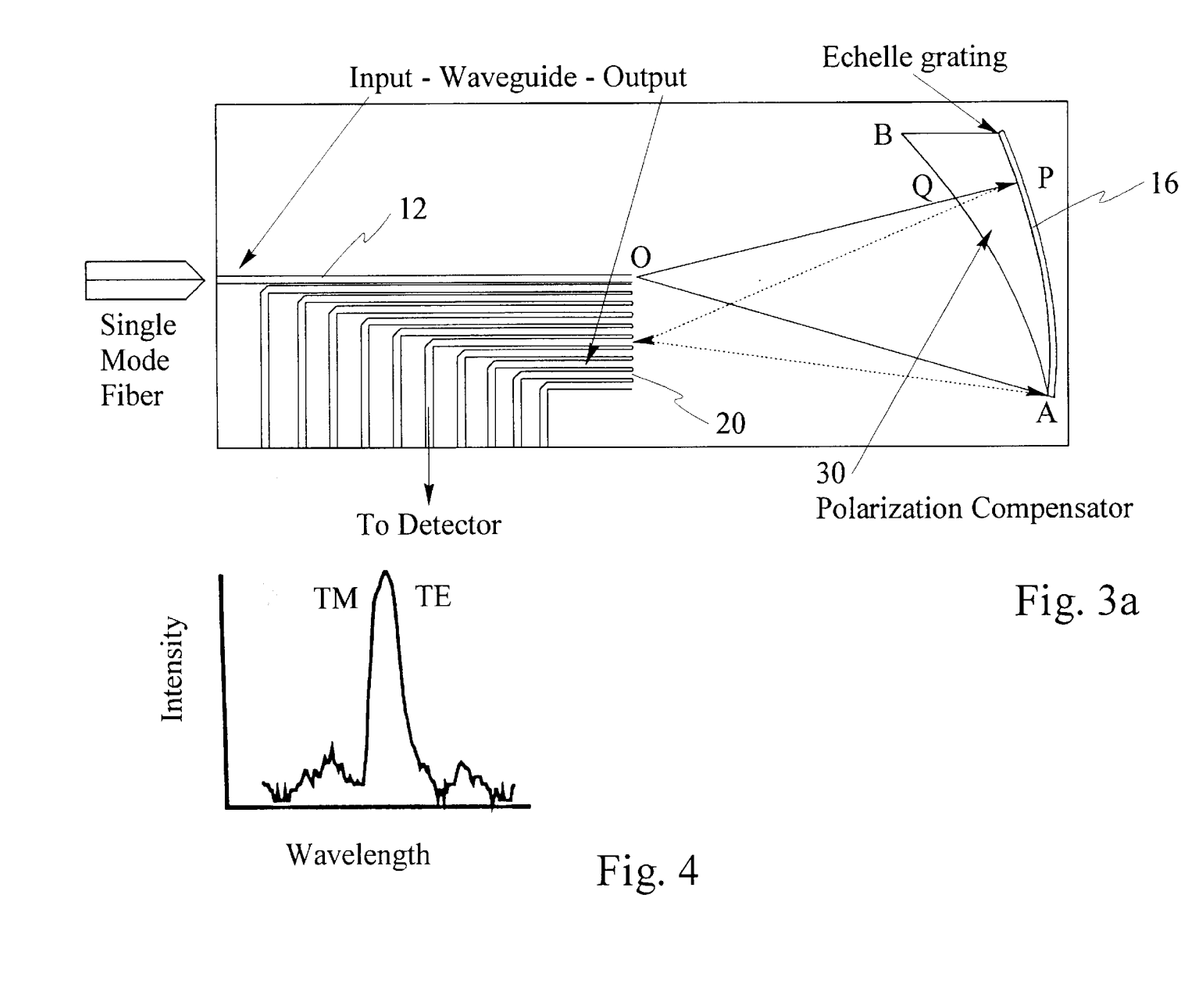
Figure 3B:
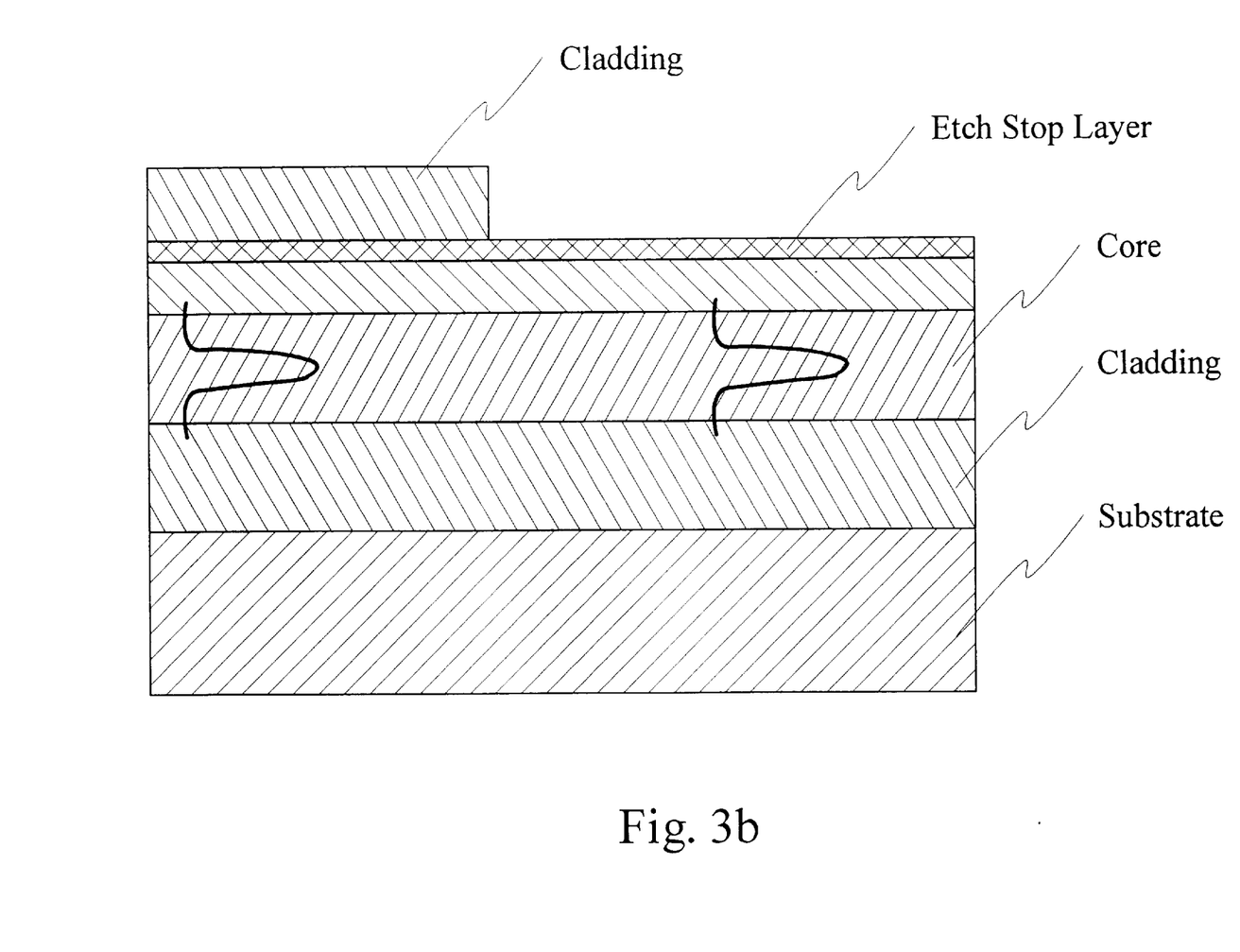
FIG. 3b is a side view in cross section of a portion of the wavelength demultiplexer showing the slab waveguiding region including the polarization compensation region.

A wavelength demultiplexer with a polarization compensator 30 in accordance with this invention is schematically shown in FIG. 3a. The polarization compensator 30 consists of a shallow etched region close to the grating. Preferably, the region has a specific shape designed according to the criteria described below. The shallow etched area has a different effective index difference $\Delta n'$ between TE and TM modes. It covers the grating on one side and its boundary curve AB on the other side is determined by $\delta L_p = \Delta L_p/(\Delta n'/\Delta n - 1)$, where $\Delta L_p = \overline{OA} - \overline{OP}$ with the point O being the end of the input waveguide, A, the far end of the grating curve and P, any given point on the grating; $\delta L_p = \overline{PQ}$ is the distance from the point P to the compensator boundary measured along the line $\overline{OP}$.

Tests results have revealed that that such designed compensator can completely or at least substantially eliminate the polarization dependent wavelength shift of the demultiplexer. The physical principle governing the polarization compensator 30 can be understood as following. In a conventional demultiplexer such as the one in FIG. 1, the wavelength of the signal that is received by a given output waveguide must satisfy $$\Delta \Phi = 4\pi n \Delta L_p/\lambda = 2m N\pi \qquad (1)$$

where $\Delta\Phi$ is the phase difference between the light reflected by the grating facets at point A and point P, $\lambda$ the wave vector in the vacuum, n the effective index of the slab waveguide, m the order of the grating and N the number of grating periods between A and P. This leads to the following relation between the channel response wavelengths for TE and TM modes:

$$\frac{n_{TE}}{\lambda_{TE}} = \frac{n_{TM}}{\lambda_{TM}} \quad (2a)$$

thus $$\Delta\lambda = \lambda_{TE} - \lambda_{TM} = \frac{\Delta n}{n}\lambda \quad (2b)$$

where $\Delta n = n_{TE} - n_{TM}$ is the effective index difference of the slab waveguide for TE and TM modes.

After the inclusion of the compensator, the $\Delta\Phi$ condition can be written as $$\Delta\Phi \approx 4\pi[n\Delta L_p - (n'-n)\delta L_p]/\lambda = 2mN\pi \quad (3)$$

where n' is the effective index of the etched area. The relation between the channel wavelengths of TE and TM modes becomes $$\frac{n_{TE}\Delta L_p - (n'_{TE} - n_{TE})\delta L_p}{\lambda_{TE}} = \frac{n_{TM}\Delta L_p - (n'_{TM} - n_{TM})\delta L_p}{\lambda_{TM}} \quad (4a)$$

thus $$\Delta\lambda = \frac{\Delta n \Delta L_p - (\Delta n' - \Delta n)\delta L_p}{n\Delta L_p - (n'-n)\delta L_p}\lambda \quad (4b)$$

The condition for polarization insensitivity, i.e. $\Delta\lambda=0$, can then be obtained by $$\Delta n \Delta L_p - (\Delta n' - \Delta n)\delta L_p = 0 \quad (5)$$

that is $$\delta L_p = \Delta L_p/(\Delta n'/\Delta n - 1) \quad (6)$$

As an example, in a typical layer structure, the effective indices of the slab waveguide for TE and TM modes are $n_{TE}=3.18303$, and $n_{TM}=3.18221$ at 1.56 $\mu$m. The index difference is therefore $\Delta n=8.2\times10^{-4}$. After etching to the etch-stop layer of the waveguiding structure, the effective indices become $n_{TE}=3.17585$, and $n_{TM}=3.17342$. The index difference becomes $\Delta n'=2.43\times10^{-3}$. The polarization compensation condition gives $\delta L_p/\Delta L_p=0.513$. For a grating 1 mm in height and operating at 55° incidence angle, the path length difference for the two ends of the grating is $\Delta L \approx 1.4$ mm. This leads to the topside length of the polarization compensator $\delta L \approx 0.72$ mm.

Since the effective index change due to etching (or induced by other techniques) is very small, Eq. (4b) can be approximately rewritten as $$\Delta\lambda \approx \frac{\Delta n \Delta L_p - (\Delta n' - \Delta n)\delta L_p}{n\Delta L_p}\lambda = \left(\frac{\Delta n}{n} - \frac{\Delta n' - \Delta n}{n} \cdot R\right)\lambda \quad (7)$$

where we have defined the parameter $$R = \frac{\delta L_p}{\Delta L_p}.$$

Therefore, we can also control the TE-TM wavelength split to any degree by adjusting the R value.

The wavelength shift after the introduction of the polarization compensator can be derived by equating Eq. (1) and (3), that is $$\frac{n\Delta L_p}{\lambda} = \frac{n\Delta L_p - (n'-n)\delta L_p}{\lambda'}$$

where $\lambda$ and $\lambda'$ are the channel response wavelengths before and after the introduction of the polarization compensator. From this equation, we can obtain $$\lambda' = \lambda\left(1 + \frac{n-n'}{n} \cdot R\right) \quad (8)$$

Figure 5:
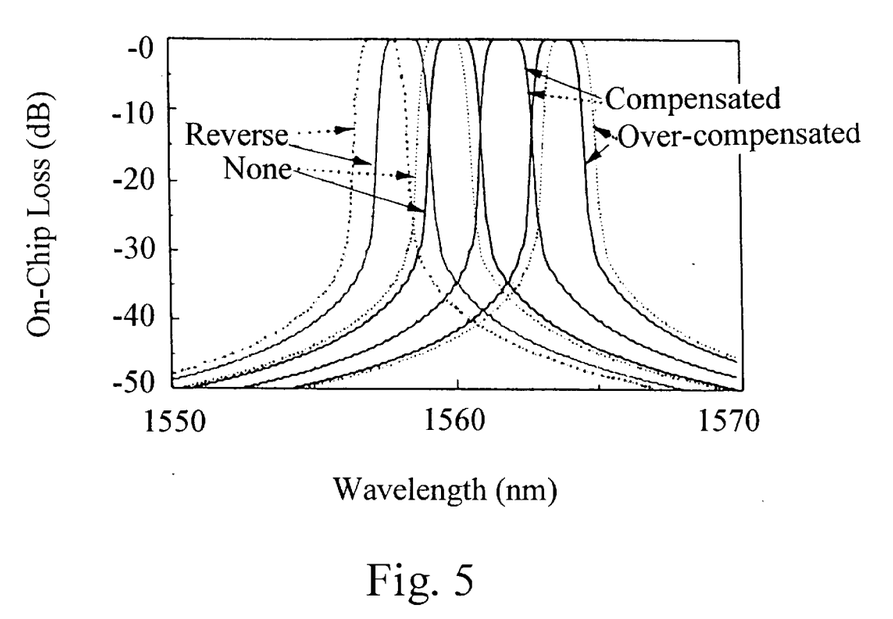
FIG. 5 is a graph of on chip loss (dB) versus wavelength depicting simulated channel response functions of the demultiplexers with different degrees of polarization compensation.

FIG. 5 shows the channel response functions of the demultiplexer simulated using Kirchhoff-Huygens diffraction integral formula, for different degrees of polarization compensation corresponding to R=0 (no compensation), R=0.51 (substantially compensated), R=1.02 (over-compensated), and R=−0.51 (reverse compensated). It can be seen that when there is no compensation, the channel wavelength for TM mode is about 0.4 nm shorter than that of TE mode. As the R value increases, the channel response functions for both TE and TM modes shift to longer wavelengths. The amount of shift is larger for the TM mode than for the TE mode. The response functions for TE and TM modes substantially overlap at the polarization compensation condition, R=0.51.

Figure 6:
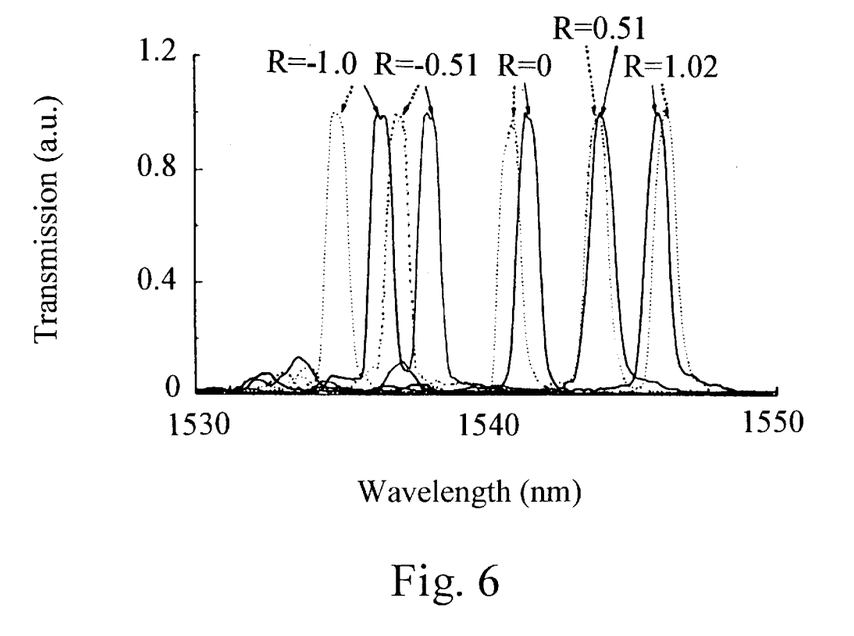
FIG. 6 is a graph of experimentally measured transmission versus wavelength spectrum which illustrates the channel response functions of the demultiplexer for different degrees of polarization compensation corresponding to different values of R.
Figure 7A:
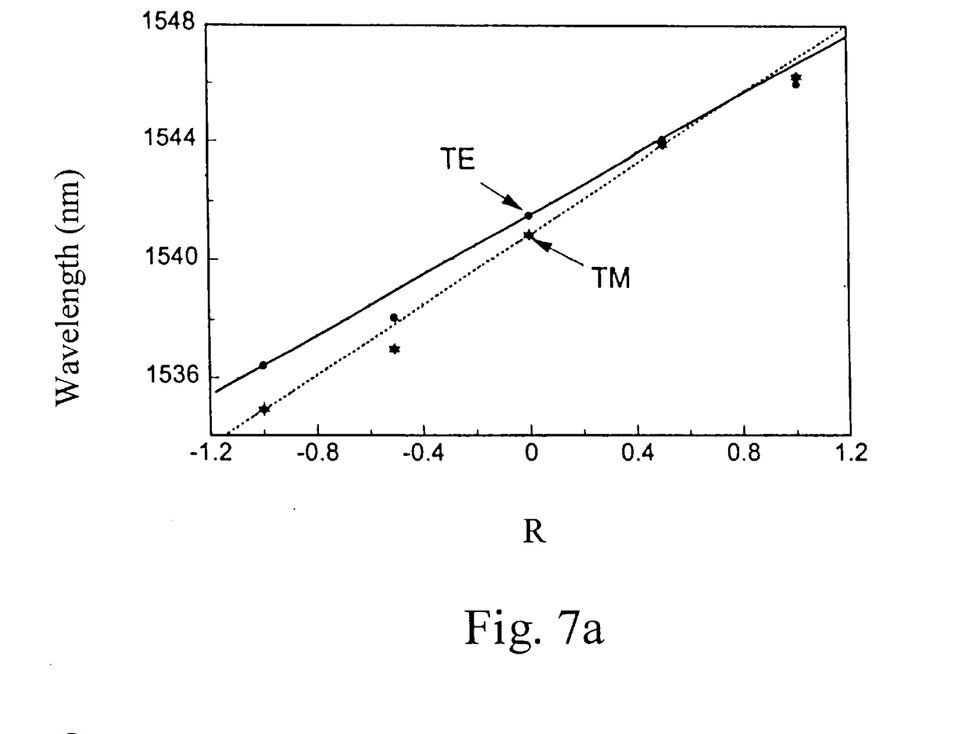
FIG. 7a is a graph of wavelength versus R which compares the calculated (solid line) and measured TE and TM wavelengths.
Figure 7B:
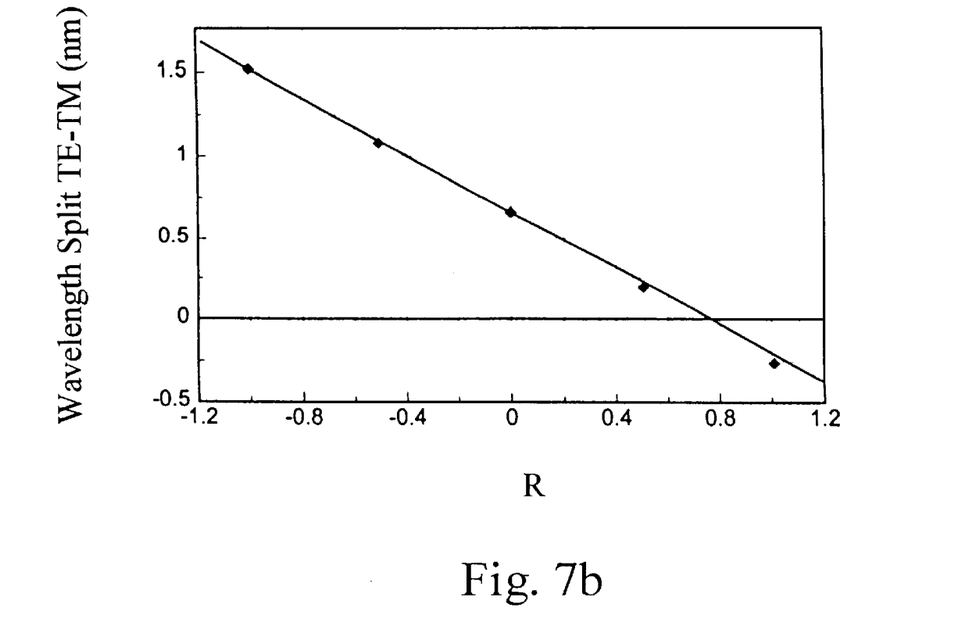
FIG. 7b is a graph of wavelength split versus R which compares the calculated (solid line) and measured TE and TM wavelengths.

Initial experimental results, presented in FIGS. 6 and 7, verify the above modeling. FIG. 6 presents the measured TE and TM spectra from five demultiplexer chips with different degrees of polarization compensation. Due to an error in the etching and a slight variation in the waveguide structure which modified the initial TE-TM splitting, complete compensation was not achieved. However, the polarization splitting was reduced from 0.66 nm to 0.20 nm, and changed sign to −0.26 nm in the over-compensated version, R=1.02. The splitting became larger for the reverse-compensated versions (R=−0.5 1 and −1.00), exactly as predicted by simulation.

FIG. 7a compares the calculated and measured TE and TM wavelengths as well as the wavelength split (FIG. 7b) as a function of the R-value. Excellent agreement has been obtained, especially for the wavelength splitting. The slight deviation between theory and experiments on the wavelength position of the peak in some chips is due to the non-uniformity of the wafer and possibly some slight errors in writing the gratings.

Figure 8:
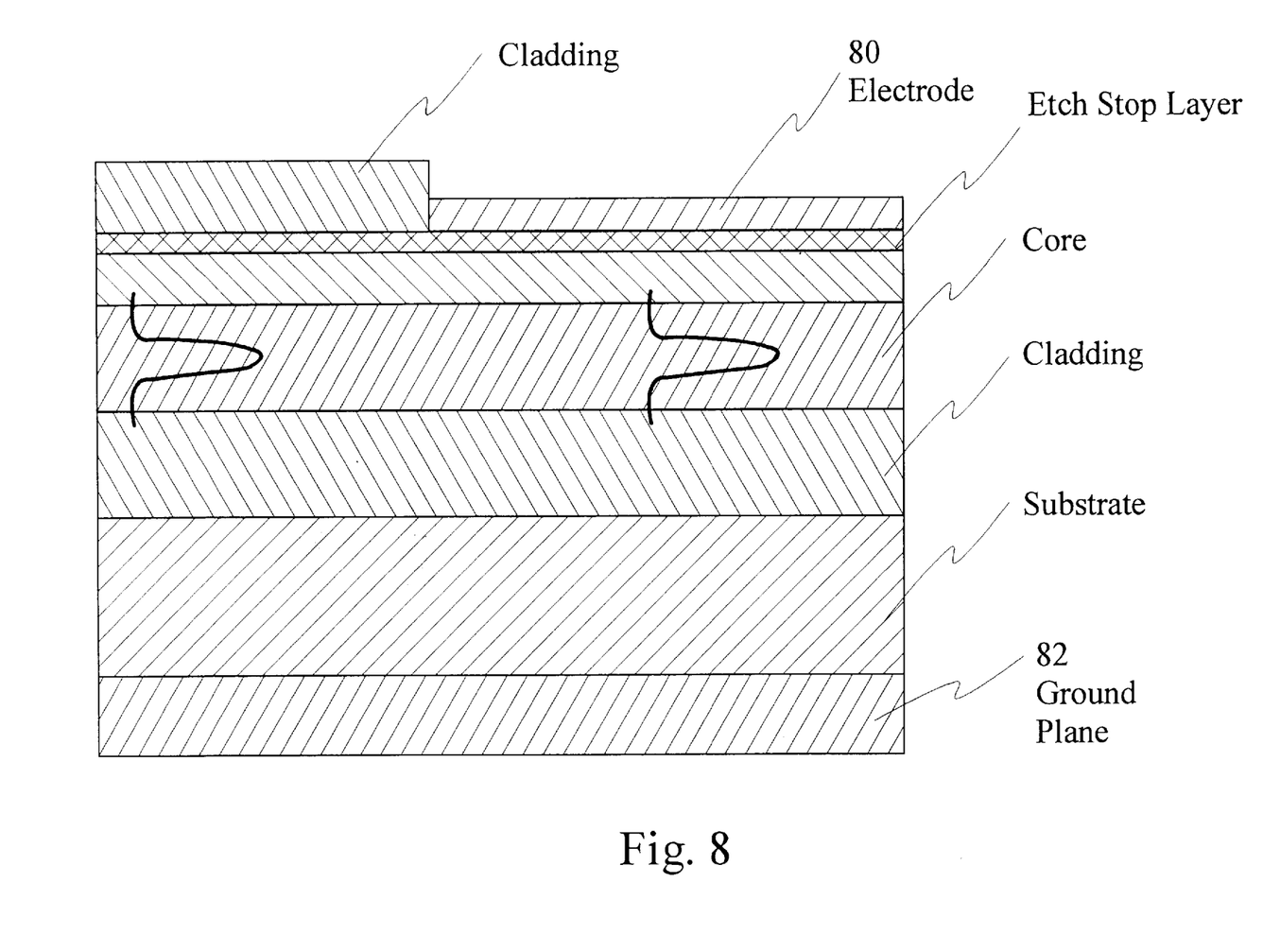
FIG. 8 is a side view in cross section of a portion of a wavelength demultiplexer similar to the one shown in FIG. 3b and also including electrodes in the form of a planar electrode and a ground plane, showing the slab waveguiding region including the polarization compensation region; and, FIG. 9 is a top view of a phased array waveguide demultiplexer having two polarization compensation regions.

It should be noted that, although modeling and experiments were related to semiconductor waveguide structures and etching was the selected technique for achieving the required effective refractive index difference, the polarization compensator in accordance with this invention can be applied to other material systems such as glass, plastic, and $SiO_2/Si$ waveguides. Techniques other than etching for achieving an index difference can also be used, such as ion implantation and diffusion. By using an electrode of the shape of the compensator or alternatively a portion of the compensator, an adjustable polarization compensator can also be realized by using current injection, applying a suitable voltage across the region, electro-optic effect, thermo-optical effect, or any other mechanism capable of modifying the effective index of the waveguide. Hence a compensation region can be formed having a fixed birefringence difference from the principal slab waveguide and electrodes may conveniently be provided to obtain a controllable refractive index change in combination with the fixed birefringence. Alternatively the index of some materials may be changed sufficiently by optical effects, by irradiating the compensator region with a suitable wavelength and intensity of light. Referring now to FIG. 8, a schematic view shows a structure wherein planar electrodes in the form of an upper electrode 80 and a ground plane 82 below a substrate layer 84 provide means of, for example, injecting current into the device or providing a controllable electric field sufficient for changing the refractive index of the waveguide therebetween. Although not shown in this figure, two or more polarization offsetting/compensating regions may be provided having similar electrodes. For example a first electrode and its ground plane can be used for changing the refractive index sufficiently to provide a switching function such that a particular wavelength of light to be demultiplexed is directed to one of a plurality of waveguides in a first non-switched mode, and to one of a plurality of different waveguides in a second switched mode. Of course since the refractive index can be dynamically changed, the wavelength can be switched between a plurality of waveguides dependent upon the applied switching stimulus across the offsetting/compensation region, in this instance serving as a switching region. In addition, a second offsetting/compensating region can be provided to correct for unwanted polarization splitting in the form of unwanted wavelength shifts between TE and TM modes. The provision of two such offsetting/compensation regions is practicable for both reflective gratings and transmissive gratings as will hereafter be described.

Figure 9:
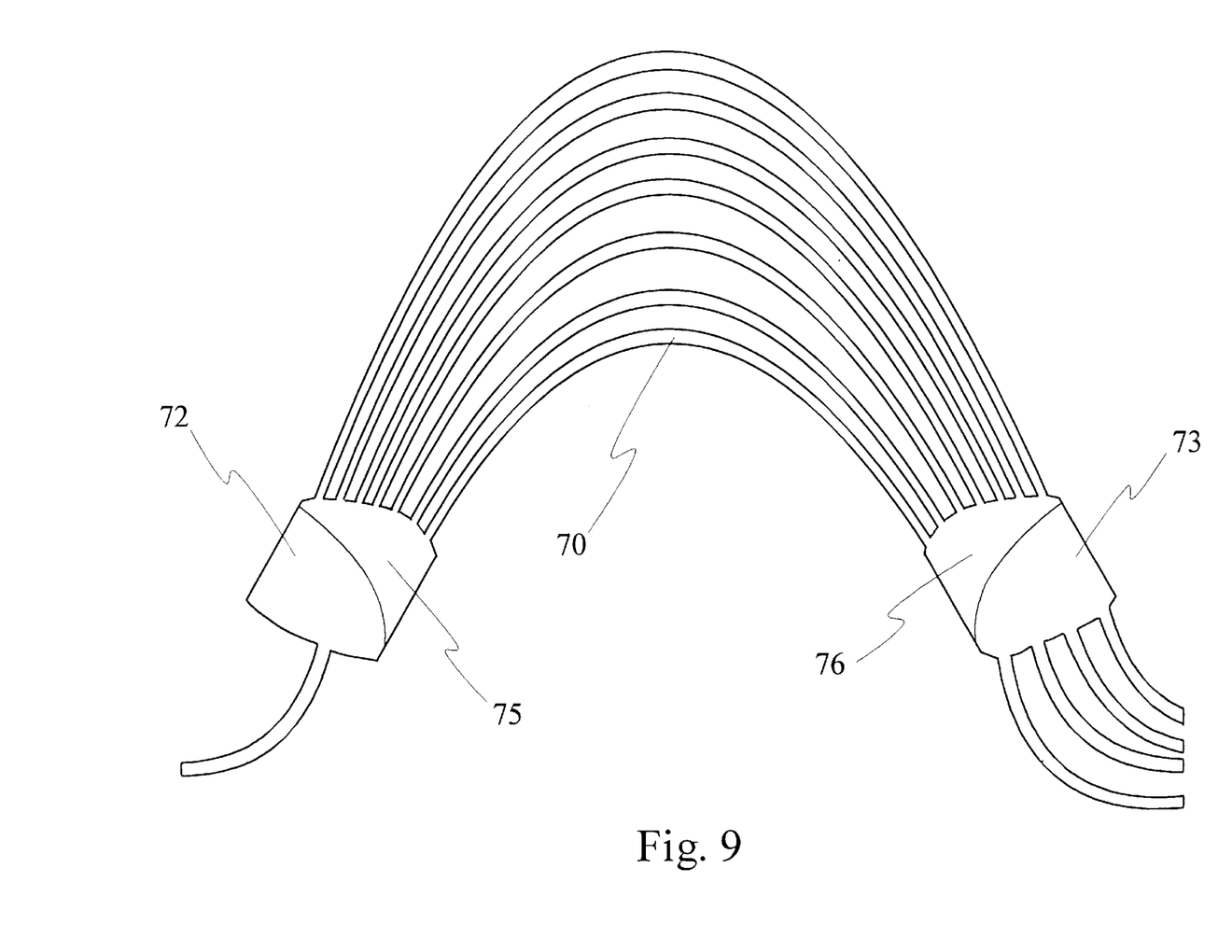

The term offset used in this specification shall mean changing the birefringence of a region so as to control the amount of polarization sensitivity exhibited by the device. The provision of a compensation region within a slab waveguide to offset or compensate for polarization effects or differences between TE and TM modes, can also be used for devices based on transmissive diffraction gratings such as phased array waveguide gratings, or ruled gratings having a planar slab waveguiding region. In these instances, the polarization compensation region can be disposed either between the input port and the grating element, or between the grating element and the output region or both, as shown in FIG. 9. In the case of the phased array, in particular, this method has the advantage of a simpler fabrication process compared to prior art devices such as the one shown in U.S. Pat. No. 5,623,571 mentioned above, as the instant invention only requires a single etching or regrowth step.

Turning now to FIG. 9, planar slab waveguide regions 72 and 73 are shown having an array of waveguides 70 of different lengths disposed therebetween. In this embodiment, triangular-like polarization compensation regions 75 and 76 are provided. These regions may conveniently be etched or other means may be used aside from etching or in combination with etching to alter the effective index of the regions 72 and/or 73. Instead of etching down to an etch stop layer, or in addition to etching to provide a compensation region having a fixed different birefringence, one or both of these regions may have the slab waveguide compensation region between an electrode layer and a ground plane, thereby providing a device that to some degree can be dynamically controlled, similar to what is shown in FIG. 8 for the diffraction grating. As well, the region 75 or another region within the slab waveguide region 72 can have a planar electrode and ground plane to provide means of optically switching particular wavelengths between various output waveguides, wherein another region within 72 or 73 can be provided with an planar electrode and ground plane to control and offset dynamically changing polarization effects that result from switching.

This invention provides a convenient method of compensating the polarization dispersion in grating based wavelength demultiplexers by incorporating a specially shaped area with modified index. Its implementation in the fabrication process of the device using a standard shallow etch technique is very simple and relatively inexpensive to implement. In fact, it does not require any additional processing steps since the polarization compensator can be chemically etched at the same time as the shallow input ridge waveguides. The etching depth can be well controlled by using an etch-stop layer. It can be applied to a wide range of waveguide structures and material systems. The method and device of this invention can lower the requirement on the birefringence of the slab waveguide so that the structure can be designed to better suit other performance considerations of the device. It is therefore believed to be preferable to all other methods reported in the literature for polarization compensation.

Of course numerous other embodiments may be envisaged. For example, this technique can also be used to control the polarization sensitivity to any degree, thus making devices useful for polarization monitoring and other applications requiring control of the polarization state.

What is claimed is:

1. An integrated polarization compensated optical waveguide diffraction grating device comprising:

an input region having an input port, an output region having at least a plurality of predetermined light receiving locations, a first slab waveguide region having a first birefringence, said slab waveguide region being optically coupled with the input and output regions for partially confining a beam of light launched from the input region between two substantially parallel planes, a diffraction grating disposed to receive a beam of light launched from the input port through the slab waveguide region and to separate the beam into sub-beams of light of different wavelengths to the plurality of predetermined light receiving locations, a second slab waveguide region adjacent to the first slab waveguide region having a predetermined shape and predetermined dimensions, said second slab waveguide region having a second different birefringence than the first slab waveguide region for providing polarization compensation of the device.

2. An integrated polarization compensated optical waveguide diffraction grating device as defined in claim 1, wherein the dimension of the second slab waveguide region and the ratio of the first birefringence and the second birefringence are selected so as to provide a same optical path length that TM polarized light traverses and TE polarized light traverses propagating from the input waveguide to at least one of the plurality of output locations.

3. An integrated polarization compensated optical waveguide diffraction grating device as defined in claim 2, wherein the shape of the second slab waveguide region is substantially triangular.

4. An integrated polarization compensated optical waveguide diffraction grating device as defined in claim 3 wherein the path length of any two rays of light launched from the input port toward the diffraction grating at two different locations will each traverse the second slab waveguide region along two different lines, the shape and dimensions of the grating being such that the length of the two different lines through the second slab waveguide region are different.

5. An optical planar waveguiding light-transmissive device comprising:
   an input/output region having an input waveguide and a plurality of predetermined light receiving locations;
   a slab waveguide having a first region having a first birefringence, said first region being optically coupled with the input/output region for partially confining a beam of light launched from the input region between two parallel planes;
   a diffraction grating disposed to receive a beam of light launched from the at least an input waveguide through the slab waveguide and to separate the beam into sub-beams of light of different wavelengths to the plurality of predetermined locations;
   a polarization offsetting region comprising a different region of the slab waveguide, the polarization offsetting region having a predetermined shape and predetermined dimensions and having a different birefringence than the first region for at least partially offsetting the birefringence of the first region.

6. An optical planar waveguiding light-transmissive device as defined in claim 5, wherein the diffraction grating is a curved grating such that a line intersecting facets of the diffraction grating is a curved line and wherein a boundary of the polarization offsetting region is adjacent to and substantially conforms to at least a portion of the curved line of the diffraction grating.

7. An optical planar waveguiding light-transmissive device as defined in claim 5, wherein the diffraction grating is a curved grating and wherein a boundary of the polarization offsetting region abuts at least a portion of the diffraction grating.

8. An optical planar waveguiding light-transmissive device as defined in claim 5, wherein at least a portion of the polarization offsetting region is sandwiched between two planar electrodes for dynamically varying the birefringence of the compensating slab waveguide region.

9. An optical planar waveguiding light-transmissive device as defined in claim 5 wherein the polarization offsetting region is formed by etching a shallow region proximate to the grating.

10. A method as defined in claim 1 wherein the step of providing the second region comprises providing planar electrodes on opposite sides of the second region, said planar electrodes for providing at least one of a current, voltage, an electro-optic signal, and thermo-optic signal to at least partially effect said second different birefringence.

11. An integrated polarization compensated optical waveguide diffraction grating device as defined in claim 4 wherein the polarization compensation region is formed by etching a shallow region, proximate to the grating, the shallow etched region having an effective refractive index difference $\Delta n'$ between TE and TM polarized light, the first region of the waveguide having an effective refractive index difference of $\Delta n$ between TE and TM polarized light, the shallow etched region having a first boundary that is substantially coincident with a curve of the grating on one side and said shallow etched region having a second boundary curve AB on the other side that is substantially determined by $\delta L_p = \Delta L_p/(\Delta n'/\Delta n - 1)$, where $\Delta L_p = \overline{OA} - \overline{OP}$ with the point O being the end of the input waveguide, the point A being substantially at an end of the grating curve and the point P being any point on the grating; and, wherein $\delta L_p = \overline{PQ}$ which is the distance from the point P to the polarization compensation region boundary measured along a line $\overline{OP}$, wherein for a different value of $\Delta L_p$ a different value of $\delta L_p$ results.

12. An optical planar waveguiding light-transmissive device as defined in claim 5, wherein the path length of any two rays of light launched from the input waveguide toward the grating at two different locations will each traverse the polarization compensation region along two different lines, the shape and dimensions of the polarization compensation region being such that the length of the two different lines through the polarization compensation region are different.

13. An optical planar waveguiding light-transmissive device as defined in claim 5 wherein the device comprises a semiconductor material.

14. An integrated at least substantially polarization compensated optical waveguide grating device comprising:
   an input region having an at least an input port,
   an output region having at least a plurality of predetermined light receiving locations for receiving light from the input region,
   an input slab waveguide region and an output slab waveguide region each having a predetermined birefringence, said input slab waveguide region being optically coupled with the input region for partially confining a beam of light launched from the input region between two parallel planes, said output slab waveguide region being optically coupled with the output region for partially confining a beam of light launched from the input region between two parallel planes,
   a grating disposed between the input slab waveguide region and the output slab waveguide region to receive a beam of light launched from the at least the input port through the input slab waveguide region and to separate the beam into sub-beams of light of different wavelengths to the plurality of predetermined light receiving locations through the output slab waveguide region,
   a compensating slab waveguide region between the input port and the output region having a predetermined shape and predetermined dimensions and having a different birefringence than the predetermined birefringence of at least one of the input and output slab waveguide regions for providing polarization compensation of the device.

15. An integrated at least substantially polarization compensated optical waveguide grating device as defined in claim 14, wherein the dimension and birefringence of the compensating slab waveguide region are selected so as to provide a same optical path length that TM polarized light traverses and TE polarized light traverses propagating from the input port to at least one of the plurality of output locations.

16. An integrated at least substantially polarization compensated optical waveguide grating device as defined in claim 14, wherein the grating is a phased waveguide arrayed grating comprising an array of waveguides disposed between the input slab waveguide region and the output slab waveguide region.

17. An integrated at least substantially polarization compensated optical waveguide grating device as defined in claim 16 wherein the compensating slab waveguide region is disposed between at least one of the input region and the phased array waveguide grating and the output region and the phased array waveguide region.

18. An integrated at least substantially polarization compensated optical waveguide grating device as defined in claim 16, wherein the at least a portion of the compensating slab waveguide region is sandwiched between two planar electrodes for dynamically varying the birefringence of the compensating slab waveguide region.

19. An integrated at least substantially polarization compensated optical waveguide grating device as defined in claim 18, wherein the electrodes are for providing an electrical, optical, or thermal effect to vary the birefringence of the compensating slab waveguide region.

20. An optical planar waveguiding light-transmissive device comprising:
   an input region having an input port and a plurality of predetermined light receiving locations at an output region;
   input and output slab waveguide regions each having a predetermined birefringence, said input slab waveguide region being optically coupled with the input port for partially confining a beam of light launched from the input port between two parallel planes; said output slab waveguide region being optically coupled with the output locations for partially confining a beam of light launched thereinto between two parallel planes;
   a transmissive grating disposed to receive a beam of light launched from the at least an input port and to provide beams to the output slab waveguide for separation into sub-beams of light of different wavelengths to the plurality of predetermined locations;
   a polarization-offsetting region comprising at least a different region of at least one of the slab waveguides, the polarization offsetting region having a different birefringence or being able to exhibit a different birefringence than a region of the at least one of the slab waveguides, for offsetting its birefringence.

21. A device as defined in claim 20, wherein the polarization-offsetting region is of a predetermined shape and size.

22. A device as defined in claim 20, wherein the polarization-offsetting region comprises a portion of the input slab waveguide.

23. A device as defined in claim 20, wherein the polarization-offsetting region comprises a portion of the output slab waveguide.

24. A device as defined in claim 20, comprising a second polarization-offsetting region, one of the polarization-offsetting regions comprising a portion of the input slab waveguide and the other of the offsetting regions comprising a portion of the output slab waveguide.

25. A device as defined in claim 24, wherein one of the polarization-offsetting regions provides a means of switching wavelengths of light to different output locations, and wherein the other of the offsetting regions provides a means of at least substantially compensating for differences in birefringence between TM and TE modes.

26. A device as defined in claim 14, wherein the grating is a phased array grating comprising an array of waveguides having different optical path lengths.

27. A device as defined in claim 14 wherein the device is comprised of a dielectric material.

28. A device as defined in claim 20, wherein the grating is a phased array grating comprising an array waveguides having different optical path lengths.

* * * * *

UNITED STATES PATENT AND TRADEMARK OFFICE
CERTIFICATE OF CORRECTION

PATENT NO.    : 5,937,113
DATED         : August 10, 1999
INVENTOR(S)   : He et al.

It is certified that error appears in the above-identified patent and that said Letters Patent is hereby corrected as shown below:

Column 11,
Lines 51 to 56, cancel claim 10.
Line 57, "11" should be --10 --.
Line 58, "claim 4" should be -- claim 1 --

Column 12,
Line 9, "12" should be -- 11 --
Line 17, "13" should be -- 12 --
Line 20, "14" should be -- 13 --
Line 51, "15" should be --14 --
Line 53, "claim 14" should be -- claim 13 --
Line 59, "16" should be -- 15 --
Line 61, "claim 14" should be -- claim 13 --
Line 65, "17" should be -- 16 --
Line 67, "claim 16" should be -- claim 15 --

Column 13,
Line 3, "18" should be -- 17 --
Line 6, "claim 16" should be -- claim 15 --
Line 10, "19" should be --18 --
Line 12, "claim 18" should be -- claim 17 --
Line 15, "20" should be -- 19 --

UNITED STATES PATENT AND TRADEMARK OFFICE
CERTIFICATE OF CORRECTION

PATENT NO. : 5,937,113
DATED : August 10, 1999
INVENTOR(S) : He et al.

It is certified that error appears in the above-identified patent and that said Letters Patent is hereby corrected as shown below:

<u>Column 14,</u>
Line 5, "21" should be -- 20 --
Line 5, "claim 20" should be -- claim 19 --
Line 8, "22" should be -- 21 --
Line 8, "claim 20" should be -- claim 19 --
Line 12, "23" should be -- 22 --
Line 12, "claim 20" should be -- claim 19 --
Line 15, "24" should be -- 23 --
Line 15 "claim 20" should be -- claim 19 --
Line 20, "25" should be -- 24 --
Line 26, "26" should be -- 25 --
Line 26, "claim 14" should be -- claim 13 --
Line 29, "27" should be -- 26 --
Line 29, "14" should be -- 13 --
Line 31, "28" should be -- 27 --
Line 31, "claim 20" should be -- claim 19 --

Signed and Sealed this

Twenty-third Day of July, 2002

*Attest:*

*Attesting Officer*

JAMES E. ROGAN
*Director of the United States Patent and Trademark Office*